(12) United States Patent
Chickering (10) Patent No.: US 6,505,185 B1
(45) Date of Patent: Jan. 7, 2003

(54) DYNAMIC DETERMINATION OF CONTINUOUS SPLIT INTERVALS FOR DECISION-TREE LEARNING WITHOUT SORTING

(75) Inventor: D. Maxwell Chickering, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/539,207

(22) Filed: Mar. 30, 2000

(51) Int. Cl.[7] ................................................. G06N 7/00
(52) U.S. Cl. ........................................ 706/55; 707/100
(58) Field of Search .............................. 706/55, 45, 46; 700/90; 707/5, 100

(56) References Cited

U.S. PATENT DOCUMENTS 6,385,607 B1 * 5/2002 Iyengar ...................... 707/100

OTHER PUBLICATIONS

P. A. Broadbery et al; On the Implementation of Dynamic Evaluation; 1995; ACM; 0–89791–699–9/95/0007; 77–84.*

* cited by examiner

*Primary Examiner*—Thomas Black
*Assistant Examiner*—Joseph P. Hirl
(74) *Attorney, Agent, or Firm*—Amin & Turocy, LLP (57) ABSTRACT

The dynamic determination of continuous split intervals for decision trees, without sorting, is disclosed. In one embodiment, the continuous split intervals are determined based on the mean of a relevant sub-set of the set of training data. In another embodiment, they are based on the mean and the standard deviation of the relevant sub-set. In another embodiment, the intervals are based on the median instead. In still another embodiment, they are based on a number of percentiles of the relevant sub-set of the set of training data.

23 Claims, 7 Drawing Sheets

DYNAMIC DETERMINATION OF CONTINUOUS SPLIT INTERVALS FOR DECISION-TREE LEARNING WITHOUT SORTING

FIELD OF THE INVENTION

This invention relates generally to machine learning techniques, and more specifically to decision-tree learning techniques.

BACKGROUND OF THE INVENTION

Machine learning techniques are a mechanism by which accumulated data can be used for predictional and other analytical purposes. For example, web site browsing data can be used to determine which web sites are more likely to be viewed by particular types of users. As another example, product purchasing data can be used to determine which products a given consumer is likely to purchase, based on his or her prior product purchasing history, and other information.

One type of machine learning technique is decision-tree learning. A decision tree is a structure that is used to encode a conditional probability distribution of a target variable, given a set of predictor variables. For example, the predictor variables may correspond to the web sites a user has or has not already viewed, or products a user has or has not already purchased. The target variable may then correspond to a particular web site or product that an analyst is determining whether the user is likely to view or purchase, respectively. Once a decision tree has been constructed, it is navigated using a particular user's data to determine the answer to this potential viewing or purchasing query.

A decision tree is generally constructed by starting with an internal node corresponding to a predictor variable that splits into two or more branches that each end in a leaf node signifying the end of the tree with a probability regarding the target variable. In order to make the tree more accurate, leaf nodes are replaced with other internal nodes also corresponding to predictor variables, such that each of these nodes splits into two or more branches that also end in leaf nodes. Thus, by iteratively replacing leaf nodes with internal nodes, more levels are added to the tree, improving the predictional accuracy of the decision tree.

For internal nodes corresponding to predictor variables that have continuous values, the branches extending from the internal nodes have corresponding intervals, such that a given branch extending from a node and having a given interval is followed if the predictor variable for the node has a value that falls within the interval. For example, an internal node may have two branches extending from it, one having an interval of less than 7, and the other having an interval of greater than or equal to 7. If navigation of the decision tree results in landing on this node, and if the predictor variable has a value less than 7, then the former branch is followed; if the variable has a value greater than or equal to 7, then the latter branch is followed.

Identifying intervals that yield accurate decision trees is typically accomplished within the prior art by sorting the relevant training data used for constructing the tree by the value of every continuous predictor variable. Once an interval has been identified, any new leaf nodes that are also made into internal nodes must have its relevant training data resorted as well. Unfortunately, this is a time-consuming process, and can result in delays where on-the-fly, dynamic decision tree construction is required. An alternative approach used in the prior art is to a priori determine a set of static intervals. However, while this allows for quicker decision tree construction, accuracy is reduced because the intervals are not constructed dynamically. For these and other reasons, therefore, there is a need for the present invention.

SUMMARY OF THE INVENTION

The invention relates to dynamically determining continuous split intervals for decision trees, without sorting. As a result of the dynamic nature of the determination, embodiments of the invention provide for accurately constructed decision trees on-the-fly. Furthermore, since sorting is not required, the embodiments provide for quickly constructed decision trees as compared to dynamic approaches within the prior art.

In one embodiment, a method for constructing a decision tree using a set of training data starts with a current, or present, tree. A new tree is determined that has a leaf of the present tree replaced by a continuous split on a predictor variable with a number of intervals. The intervals are dynamically determined without sorting. In varying embodiments, the intervals are determined using the mean, the mean and the standard deviation, the median, or a predetermined number of percentiles of a relevant sub-set of the set of training data. If the new tree has better predictional value than the current tree, then the current tree is replaced with the new tree. This process continues until the decision tree has been constructed.

As an example using the mean, there may be two intervals: a first interval of less than the mean of the relevant sub-set of the set of training data, and a second interval of greater than or equal to the mean of the relevant sub-set of the set of training data. As another example, using both the mean and the standard deviation of the relevant sub-set of the set of training data, there may be four intervals: a first interval of less than the mean minus a multiple of the standard deviation, a second interval of greater than or equal to the mean minus the multiple of the standard deviation and less than the mean, a third interval of greater than or equal to the mean and less than the mean plus the multiple of the standard deviation, and a fourth interval of greater than or equal to the mean plus the multiple of the standard deviation. Other examples according to different embodiments of the invention could have intervals based on the median and/or a predetermined number of percentiles of the relevant sub-set of the set of training data.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
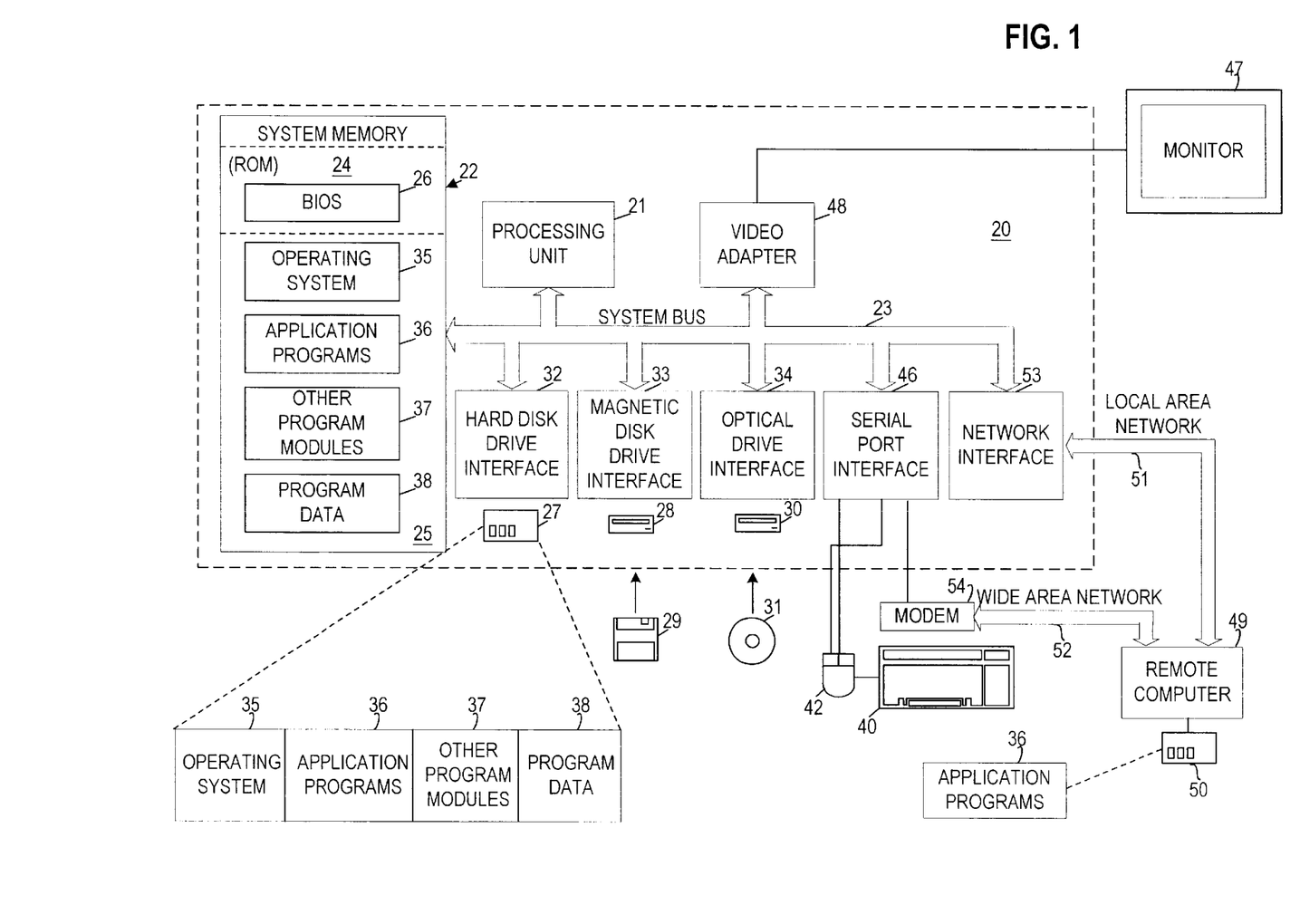
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer, including a processing unit 21, a system memory 22, and a system bus 23 that operatively couples various system components include the system memory to the processing unit 21. There may be only one or there may be more than one processing unit 21, such that the processor of computer comprises a single central-processing unit (CPU), or a plurality of processing units, commonly referred to as a parallel processing environment. The computer may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM). A basic input/output system (BIOS) 26, containing the basic routines that help to transfer information between elements within the computer, such as during start-up, is stored in ROM 24. The computer further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM, including an operating system 35, one or more application programs 36, other program modules 37, and program data 38. A user may enter commands and information into the personal computer through input devices such as a keyboard 40 and pointing device 42. Other input devices (not shown)

may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer may operate in a networked environment using logical connections to one or more remote computers, such as remote computer 49. These logical connections are achieved by a communication device coupled to or a part of the computer; the invention is not limited to a particular type of communications device. The remote computer 49 may be another computer, a server, a router, a network PC, a client, a peer device or other common network node, and typically includes many or all of the elements described above relative to the computer, although only a memory storage device has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer is connected to the local network 51 through a network interface or adapter 53, which is one type of communications device. When used in a WAN-networking environment, the computer typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer, or portions thereof, may be stored in the remote memory storage device. It is appreciated that the network connections shown are exemplary and other means of and communications devices for establishing a communications link between the computers may be used.

Decision Trees

In this section of the detailed description, decision trees, such as for which continuous split intervals can be determined in accordance with embodiments of the invention, are described. A decision tree T is a structure used to encode a conditional probability distribution of a target variable Y, given a set of predictor variables $X=\{X_1, \ldots, X_n\}$. The structure is a tree, where each internal node I stores a mapping from the values of a predictor variable $X_j$ to the children of I in the tree. Each leaf node L in the tree stores a probability distribution for the target variable Y. The probability of the target variable Y, given a set of values $\{X_1=x_1, \ldots, X_n=x_n\}$ for the predictor variables, is obtained by starting at the root of T and using the internal-node mappings to traverse down the tree to a leaf node.

The mappings in the internal nodes are referred to as splits. When an internal node I maps values of the predictor variable $X_j$ to its children nodes, it is said that $X_j$ is the split predictor variable of node I, and that I is a split on $X_j$. For example, in the diagram of FIG. 2, the decision tree 200 stores a probability distribution $p(Y|X_1, X_2, X_3)$. In the example, $X_1$ (represented as the node 202) and $X_3$ (represented as the node 204) are continuous predictor variables defined on the real line, and Y and $X_2$ have two values $\{1,2\}$.

Figure 2:
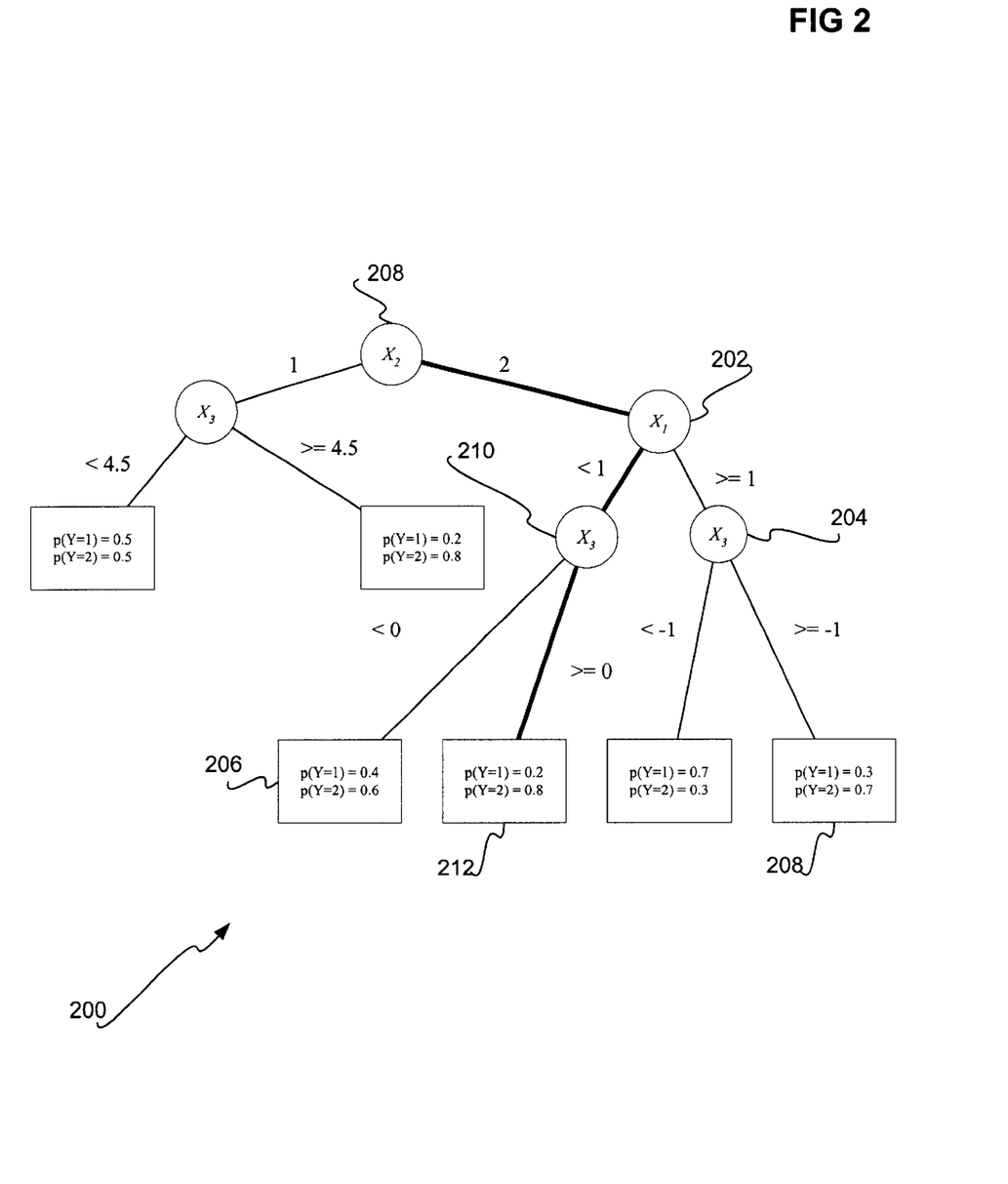
FIG. 2 is a diagram of a representative decision tree in conjunction with which embodiments of the invention can be practiced.

In the diagram of FIG. 2, the internal nodes that represent predictor variables, such as the nodes 202 and 204, are drawn with circles, and the leaf nodes, such as the nodes 206 and 208, are drawn with boxes. As the tree 200 is traversed downwards, the splits at each internal node are described by the label of the node and by the labels of the out-going edges. In particular, if the current internal node of the traversal is labeled with $X_j$, the tree 200 is traversed such that a child (node) of that node is moved to by following the edge that corresponds to the given value $x_j$.

For example, given values $\{X_1=-12.3, X_2=2, X_3=2.4\}$ for the predictor variables, $p(Y|X_1=12.3, X_2=2, X_3=2.4)$ is obtained by traversing the tree as follows (the traversal for this prediction is emphasized in FIG. 2 by dark edges). Start at the root node 208 of the tree, the root node is a split on $X_2$. Because $X_2=2$, the right-most child node 202 of the root node 208 is traversed down to. The node 202 is a split on $X_1$, which has a value −12.3, so the tree is next traversed to the left child node 210 of the node 202 because −12.3 is less than −1. Finally, because $X_3=2.4$ (and greater than or equal to 0), the tree is traversed to the right child node 212 of the node 210, which is a leaf node. The conditional distribution is extracted directly from the leaf, such that $p(Y=1|X_1=-12.3, X_2=2, X_3=2.4)=0.2$ and $p(Y\ X_1=-12.3, X_2=2, X_3=2.4)=0.8$.

Figure 3:
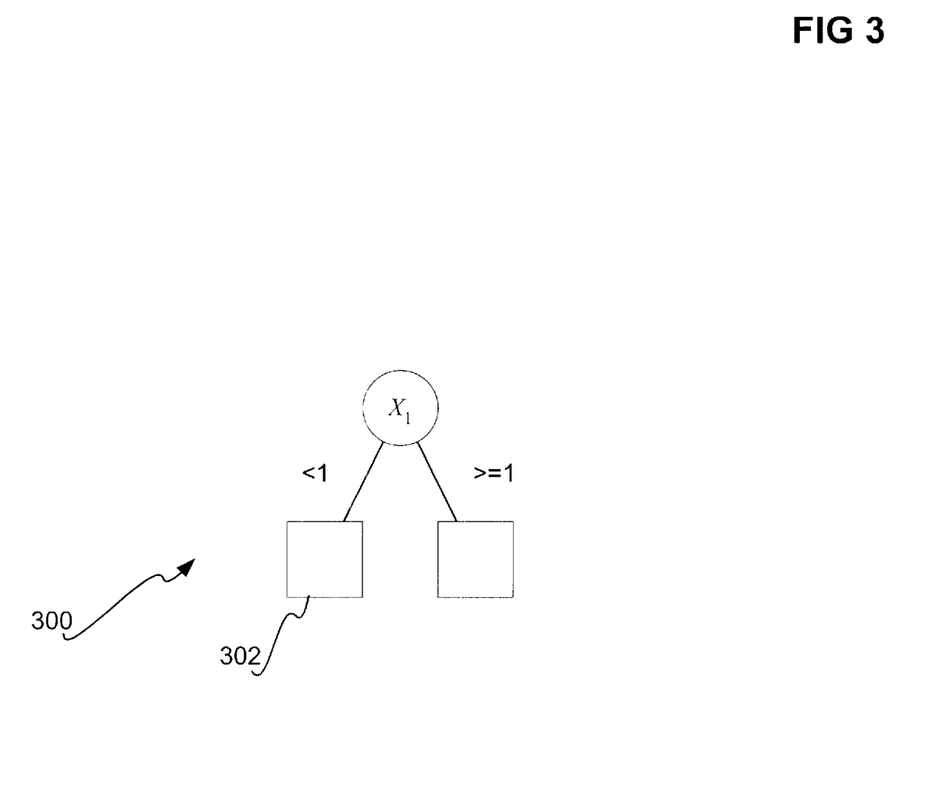
FIG. 3 is a diagram of a current, or present, decision tree having a leaf node that is under consideration for replacement by a split.
Figure 4:
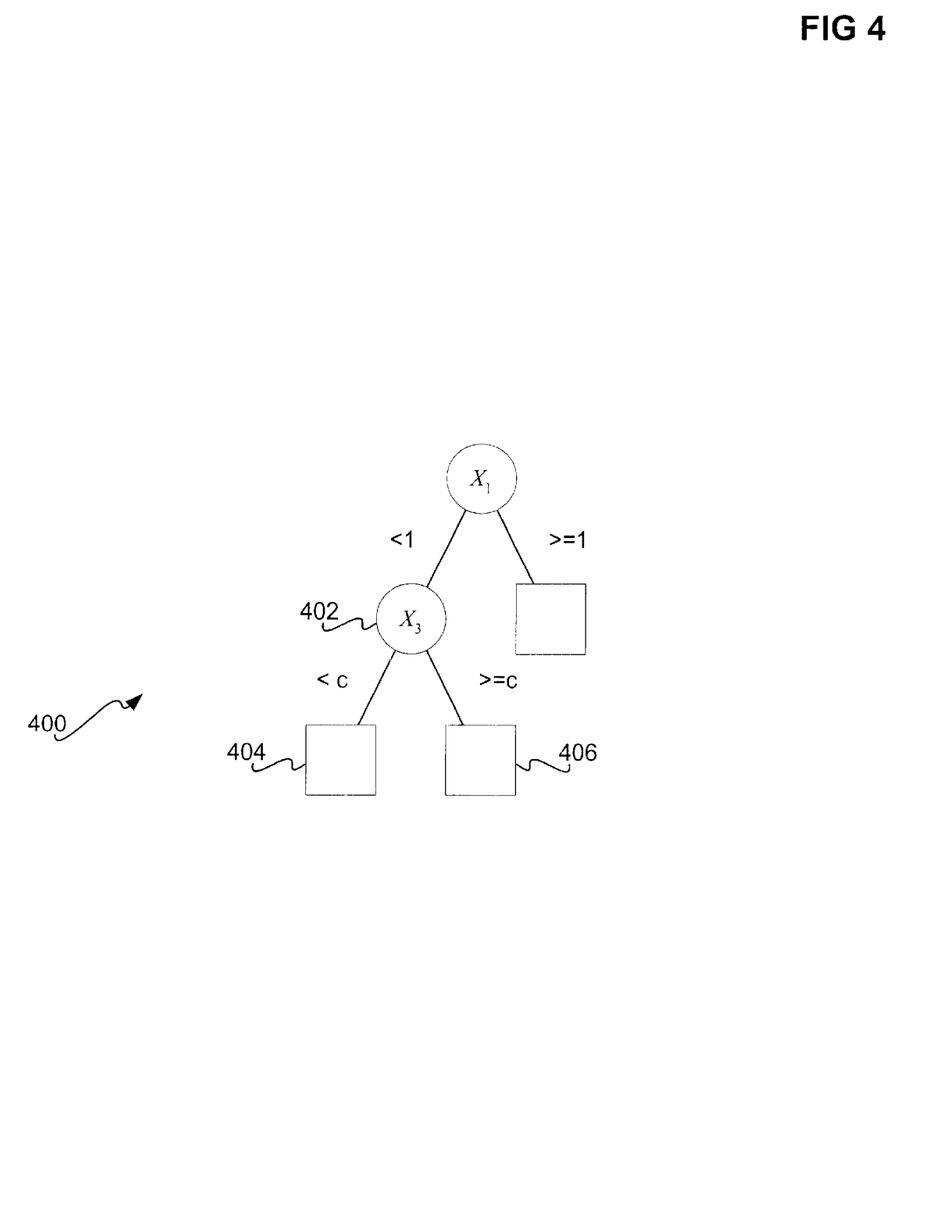
FIG. 4 is a diagram of a new decision tree in which the tree of FIG. 3 has had a leaf node replaced by a split.

Algorithms for learning decision trees from data typically try to maximize a scoring criterion by repeatedly replacing leaf nodes by internal splits. Such algorithms are known within the art. For example, given the tree 300 of the diagram of FIG. 3, an algorithm may attempt to replace the left leaf node 302 with a split on $X_3$. This is shown in the new tree 400 of the diagram of FIG. 4, in which the left leaf node 302 of the tree 300 of FIG. 3 has been replaced by the internal node 402.

The algorithm determines how good the replacement is by evaluating a scoring criterion for the original (or present or current) tree and the modified (or new) tree. Many criteria are available and are known within the art. For almost all scoring criteria, the score for replacing a leaf node L by a split is a function of the subset of a training dataset that is said to be relevant to L: For any record in a training dataset, the case is "dropped" down the tree by traversing the tree the same way as was accomplished in the example above, using the values of the variables in the record. For every case that ends up at leaf node L, the case is said to be relevant to L.

For discrete-valued predictors, a typical candidate split considered by the learning algorithm is a binary split, where one child corresponds to exactly one of the discrete states, and the other child corresponds to all other states. Another type of discrete split is a complete split, where there is exactly one child corresponding to every value of the discrete predictor.

For continuous variables, the children of split nodes correspond to intervals for the predictor variable. In principle, for a given number of children (two in the examples above), there are an infinite number of possible intervals that a split could define. In the tree 400 of FIG. 4, for example, the left child node 404 of $X_3$ could correspond to <c and the right child of $X_3$ could correspond to >=c, for any c in the continuous range of predictor variable $X_3$. However, the number of intervals that can be distinguished by most scoring criteria is limited by the number of examples in the training data that are relevant to the given leaf As noted in the background section, however, identifying these intervals within the prior art typically requires the relevant data records to be sorted by the value of every continuous predictor. Furthermore, once a split has been applied, the training data that "falls down" to the new leaf nodes needs to be resorted for all of these predictors once again. This results in decreased performance, especially where on-the-fly dynamic splits are required to be determined.

As an alternative approach within the prior art, as has also been described in the background section, continuous variables can be discretized before applying the tree-building algorithm. That is, static intervals are determined ahead of time, and the predictor variable is treated as a discrete one whose values correspond to those intervals. This static approach reduces the learning problem to one that involves only discrete variables. However, all the internal nodes in the tree must use the same set of intervals, and the choice may or may not be useful, depending on the current position in the tree. Thus, accuracy is compromised for the sake of performance (speed).

As is described in the next section of the detailed description, embodiments of the invention relate to quickly identifying candidate intervals at each internal node in the decision tree. The embodiments do not require any sorting, yet the intervals are still selected dynamically.

Continuous Splits for Predictor Variables

In this section of the detailed description, the manner by which continuous splits for predictor variables are determined—that is, the manner by which the intervals of the splits are determined—in accordance with varying embodiments of the invention are described. A first embodiment is described that utilizes the mean of the relevant data of the training data for a split. Extension embodiments to this embodiment are then described.

A predictor variable X is considered that is defined on the range (low, high), where low may be negative infinity and high may be infinity. Suppose there is a leaf node L in the tree, and replacing L with a split on X is being considered. Specifically, the binary split is considered that corresponds to the intervals (low, m) and [m, high), where m is the mean value for X in the training data that is relevant to L. The low, m and high in these intervals are referred to as the boundary values of the intervals, since they dictate the lower and upper bounds of the intervals.

Figure 5:
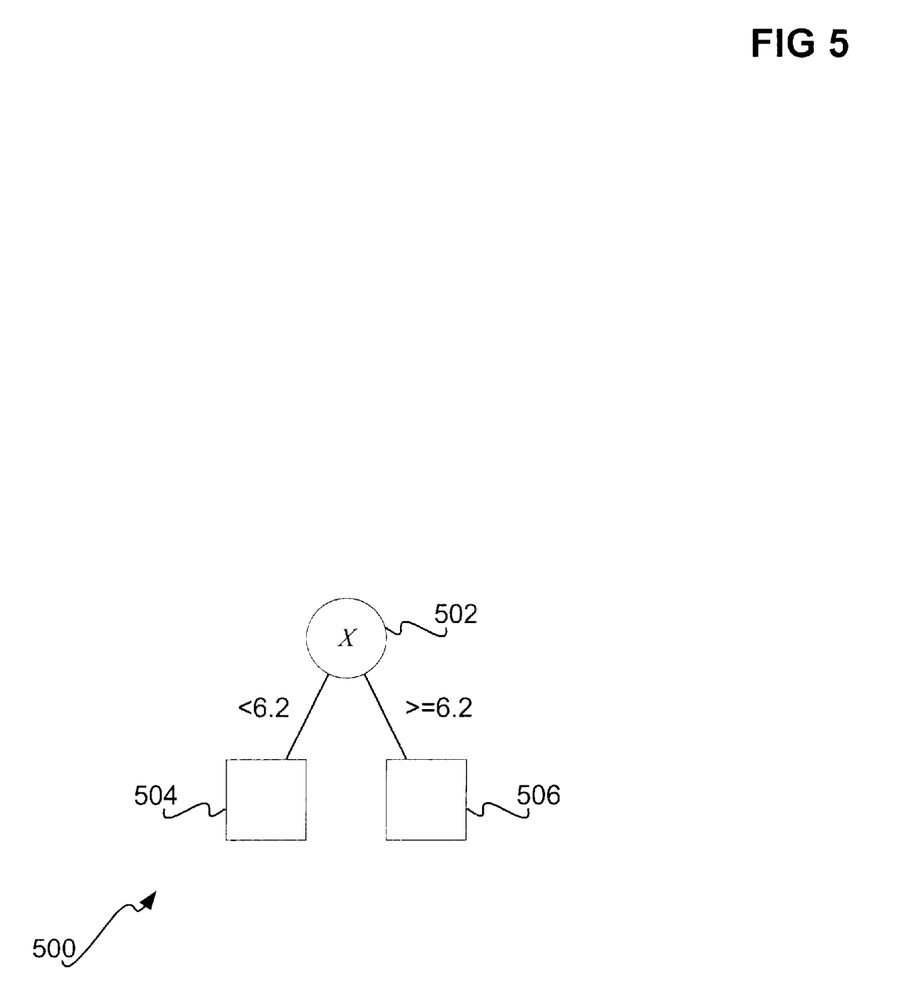
FIG. 5 is a diagram of a sub-decision tree representing a proposed split, according to an embodiment of the invention.

For example, suppose there are 10 relevant records for a leaf, and the values for X in those records are: 2, 3, 2, 1, 19, 15, 1, 4, 10, 5. The average value for X is 6.2, and what would be considered is replacing the leaf node with a split as is shown in the diagram of FIG. 5. The sub-tree 500 of FIG. 5 includes the internal node 502 representing the predictor variable X, having a split with two intervals: a first interval of less than the mean 6.2 from the node 502 that ends at the leaf node 504, and a second interval of greater than or equal to the mean 6.2 from the node 502 that ends at the leaf node 506.

Figure 6:
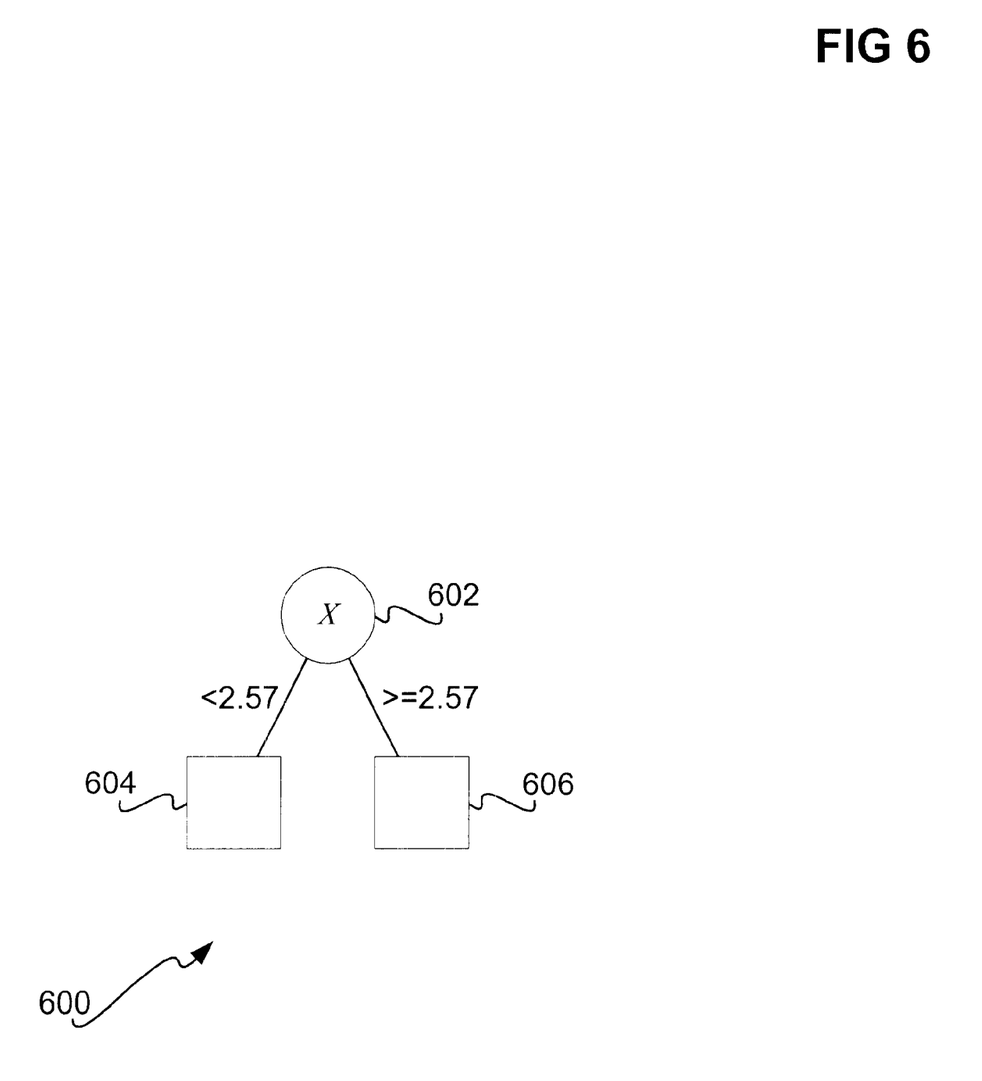
FIG. 6 is a diagram of another sub-decision tree representing a proposed split, according to an embodiment of the invention; and, FIG. 7 is a flowchart of a method according to an embodiment of the invention.

It is assumed that the algorithm being used decides to apply the split on X, and is then considering another split on X to replace the left child node 504 of FIG. 5. The data that is relevant to the left child node 504 are precisely those for which X is less than 6.2. Consequently, the values for X at this child are: 2, 3, 2, 1, 1, 4, 5. The average value (viz., the mean) for X is 2.57, and consequently what would be considered is replacing the left child with a split as is shown in the diagram of FIG. 6. The sub-tree 600 of FIG. 6 includes the internal node 602 representing the predictor variable X, having a split with two intervals: a first interval of less than the mean 2.57 from the node 602 that ends at the leaf node 604, and a second interval of greater than or equal to the mean 2.57 from the node 602 that ends at the leaf node 606. Thus, evaluating the mean value for the relevant data is accomplished as data propagates down the tree during its construction.

The embodiment of the invention described allows for splits with two children nodes. However, in another embodiment of the invention, additional children nodes of splits are provided for, by having a split with more than two intervals. For example, by determining the standard deviation as well as the mean, any number of dynamic intervals can be created. For example, let s denote the standard deviation of the predictor variable X used above. A four-child split can then be created using the following intervals: (min, -s), [-s, m), [m, s), [s, max).

Furthermore, in a different embodiment of the invention, the median of the relevant data is utilized instead of the mean, as has been described. Such an embodiment provides for two intervals—for example, a first interval of less than the median, and a second interval of greater than or equal to the median. Because the median is a special case of a percentile of the relevant data—namely, it is the $50^{th}$ percentile—other percentiles can be determined on the relevant data, in addition to or in lieu of the median, to create an equal or greater number of intervals. For example, the $25^{th}$, $50^{th}$ and $75^{th}$ percentiles can be utilized to have four intervals (e.g., up to the $25^{th}$ percentile, from the $25^{th}$ percentile up to the $50^{th}$ percentile, from the $50^{th}$ percentile up to the $75^{th}$ percentile, and greater than or equal to the $75^{th}$ percentile). As another example, only the $30^{th}$ percentile could be utilized to have four intervals. The determination of percentiles over a given set of data is generally known within the art, and in particular is described in the reference Thomas H. Cormen, Charles E. Leiserson, Ronald L. Rivest, Introduction to Algorithms, chapter 10 (1990 The MIT Press) (ISBN 0-262-03141-8).

It is noted that in some domains, a continuous variable may be missing in the training data. That is, some records of the training data set may not have a value for a particular continuous variable. In one embodiment, this is accounted for by providing a distinct interval in the decision tree corresponding to the "missing value" case. In another embodiment, the "missing value" case can be combined with an already constructed interval. As an example, if two intervals have already been determined, a first interval of less than the mean and a second interval of greater than or equal to the mean, then the "missing value" case can be accounted for in one of two ways. First, an additional interval can be added, such that there are three intervals: the first and the second intervals, and a third interval corresponding to the "missing value" case. Second, this case can be combined with an already constructed interval—e.g., a first interval of less than the mean, and a second interval of greater than or equal to the mean or the "missing value" case.

Methods

In this section of the detailed description, methods according to varying embodiments of the invention are described. In some embodiments, the methods are computer-implemented. The computer-implemented methods can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer.

Figure 7:
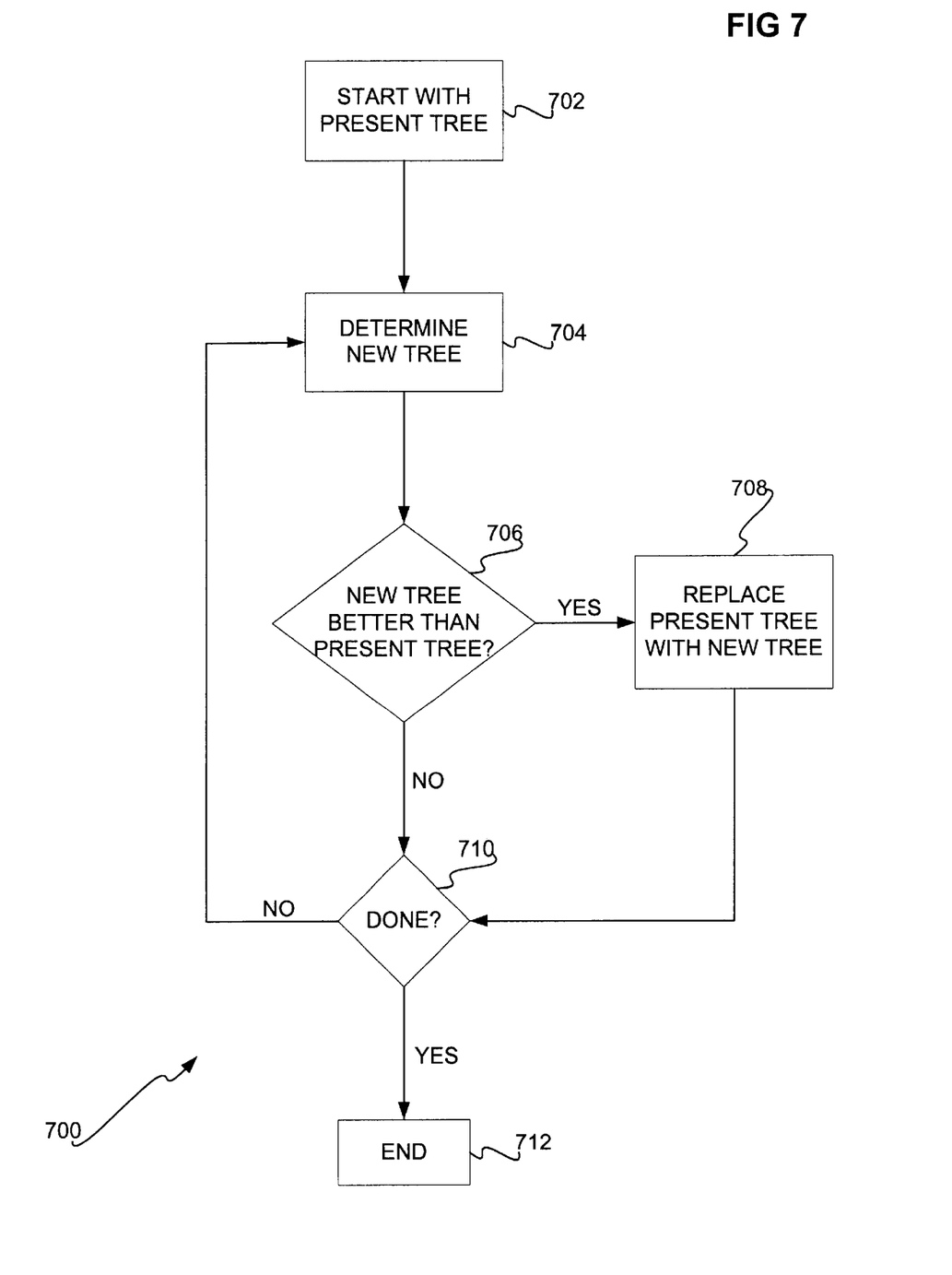

Referring to FIG. 7, a flowchart of a method 700 according to an embodiment of the invention is shown. The method 700 represents a generalized approach by which decision trees can be constructed, using continuous split intervals in accordance with embodiments of the invention as has been described in the preceding section of the detailed description. The method 700 in particular provides for the construction of a decision tree utilizing a set of training data, organized into records (or, rows or users) and variables (or, columns or dimensions). The variables include predictor variables that are specifically used in the construction of the decision tree. One or more of the variables, either the predictor variables or other variables, are target variables, which are the to-be-predicted variables as predicted by the constructed decision tree.

It is noted that the invention is not limited to any particular representation or correspondence of the training data set. For example, the data set can be the purchasing activity of consumers over a number of products. Another example is the television viewing habits of viewers over a number of television shows. Still another example is the web browsing habits of computer users over a number of Internet web sites, or particular pages within those web sites. The invention is not so particularly limited.

In 702, an initial present, or current, decision tree is started with. The invention is not limited to the manner by which a starting present decision tree is determined. In one embodiment, this initial decision tree is constructed by building a decision tree consisting of a single leaf node.

In 704, a new decision tree is created from the present tree by replacing a leaf of the present tree with a continuous split on one of the predictor variables, where the split has a number of intervals dynamically determined without sorting of a relevant sub-set of the set of training data. In other words, the intervals are determined in accordance with embodiments of the invention as have been described. The manner by which a particular leaf of the present tree is selected for replacement with a split, to make the new decision tree, is not limited by embodiments of the invention. Such manners are known within the art and are consistent with known decision tree construction algorithms, except that the split intervals are determined consistent with embodiments of the invention, as have been described in the previous section of the detailed description.

For example, in one embodiment, the split intervals are determined by first determining a mean of the relevant sub-set of the training data set, and setting the boundary values of the intervals based at least in part on the mean. As an example, there can be two such intervals: a first interval of less than the mean, and a second interval of greater than or equal to the mean. In another embodiment, a standard deviation of the relevant sub-set of the training data set is determined, such that the boundary values of the intervals are further based at least in part on the standard deviation. As an example, there can be four such intervals: a first interval of less than the mean minus a predetermined multiple of the standard deviation, a second interval of greater than or equal to the mean minus the multiple of the standard deviation and less than mean, a third interval of greater than or equal to the mean and less than the mean plus the multiple of the standard deviation, and a fourth interval of greater than or equal to the mean plus the multiple of the standard deviation.

In other embodiments of the invention, the split intervals are determined by determining the median and/or a predetermined number of percentiles of the relevant sub-set of the set of training data, such that the boundary values of the intervals are based at least in part on the median and/or one or more of the predetermined number of percentiles. As an example, there may be two intervals, a first interval of less than the median and a second interval of equal to or greater than the median. Furthermore, in some embodiments of the invention, records in the training data set which have no values for the predictor variable under consideration are accounted for, as has been described in the previous section of the detailed description.

Next, in 706, it is determined whether the new decision tree has better predictional value than the present tree. The invention is not limited to the manner by which this determination is made, and such manners are known within the art. For example, a "score" can be determined for both the new decision tree and the present decision tree, such that the tree having the higher score has the better predictional value. Such a score can be, for instance, based on entropy considerations, as known within the art. If the new tree is better than the present tree, then the method proceeds to 708, where the present tree is replaced by the new tree—that is, the present decision tree is set to equal to the new decision tree. If the new tree is not better than the present tree, then the method proceeds to 710, where the method also proceeds to from 708.

In 710, it is determined whether the decision tree has been constructed—that is, if construction of the decision tree is finished. The invention is also not limited to the manner by which this determination is made, and such manners are known within the art. If the method is not done with constructing the tree, then it proceeds back to 704, where another new decision tree is determined, and compared to the present decision tree, etc. Once the method is finished with construction the tree, the method proceeds from 710 to 712, where the method ends.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

I claim:

1. A computer-implemented method for constructing a decision tree utilizing a set of training data comprising: starting with a present tree and repeating
   a) determining a new tree having a leaf of the present tree replaced by a continuous split on a predictor variable having a plurality of intervals, the plurality of intervals dynamically determined without sorting of a relevant sub-set of the set of training data;
   b) determining whether the new tree has better predictional value than the present tree; and,
   c) upon determining that the new tree has better predictional value than the present tree, replacing the present tree with the new tree,
   until the decision tree has been constructed.

2. The method of claim 1, wherein the plurality of intervals is dynamically determined by determining a mean of the relevant sub-set of the set of training data.

3. The method of claim 2, wherein the plurality of intervals is dynamically determined by further setting a boundary value of each of the plurality of intervals as based at least in part on the mean.

4. The method of claim 3, wherein the plurality of intervals consists of a first interval and a second interval, the first interval of less than the mean, and the second interval of greater than or equal to the mean.

5. The method of claim 2, wherein the plurality of intervals is dynamically determined by further determining a standard deviation of the relevant sub-set of the set of training data.

6. The method of claim 5, wherein the plurality of intervals is dynamically determined by further setting a boundary value of each of the plurality of intervals as based on the mean and the standard deviation.

7. The method of claim 6, wherein the plurality of intervals comprises at least a first interval, a second interval, a third interval, and a fourth interval, the first interval of less than the mean minus a multiple of the standard deviation, the second interval of set less than the mean and greater than or equal to the multiple of the standard deviation, the third interval of greater than or equal to the mean and less than the mean plus and multiple of the standard deviation, and the fourth interval of greater than or equal to the mean plus the multiple of the standard deviation.

8. The method of claim 1, wherein the plurality of intervals is dynamically determined by determining a median of the relevant sub-set of the set of training data.

9. The method of claim 8, wherein the plurality of intervals is dynamically determined by further setting a boundary value of each of the plurality of intervals as based at least in part on the median.

10. The method of claim 9, wherein the plurality of intervals consists of a first interval and a second interval, the first interval of less than the median, and the second interval of greater than or equal to the median.

11. The method of claim 1, wherein the plurality of intervals is dynamically determined by determining a predetermined number of percentiles of the relevant sub-set of the set of training data.

12. The method of claim 11, wherein the plurality of intervals is dynamically determined by further setting a boundary value of each of the plurality of intervals as based at least in part on one or more of the predetermined number of percentiles.

13. The method of claim 1, wherein the plurality of intervals as dynamically determined accounts for the relevant sub-set of the set of training data potentially having missing values for the predictor variable.

14. A machine-readable medium having instructions stored thereon for execution by a processor to perform a method for constructing a decision tree utilizing a set of training data comprising:
   starting with a present tree and repeating
      a) determining a new tree having a leaf of the present tree replaced by a continuous split on a predictor variable having a plurality of intervals, the plurality of intervals based at least in part on a mean of a relevant sub-set of the set of training data, and dynamically determined without sorting of the relevant sub-set of the set of training data;
      b) determining whether the new tree has better predictional value than the present tree; and,
      c) upon determining that the new tree has better predictional value than the present tree, replacing the present tree with the new tree,
   until the decision tree has been constructed.

15. The medium of claim 14, wherein the plurality of intervals consists of a first interval and a second interval, the first interval of less than the mean, and the second interval of greater than or equal to the mean.

16. The medium of claim 14, wherein the plurality of intervals is further based at least in part on a standard deviation of the relevant sub-set of the set of training data.

17. The medium of claim 16, wherein the plurality of intervals comprises at least a first interval, a second interval, a third interval, and a fourth interval, the first interval of less than the mean minus a multiple of the standard deviation, the second interval of less than the mean and greater than or equal to the multiple of the standard deviation, the third interval of greater than or equal to the mean and less than the mean plus and multiple of the standard deviation, and the fourth interval of greater than or equal to the mean plus the multiple of the standard deviation.

18. The medium of claim 14, wherein the plurality of intervals as dynamically determined accounts for the relevant sub-set of the set of training data potentially having missing values for the predictor variable.

19. A machine-readable medium having instructions stored thereon for execution by a processor to perform a method for constructing a decision tree utilizing a set of training data comprising:
   starting with a present tree and repeating
      a) determining a new tree having a leaf of the present tree replaced by a continuous split on a predictor variable having a plurality of intervals, the plurality of intervals based at least in part on a median of a relevant sub-set of the set of training data, and dynamically determined without sorting of the relevant sub-set of the set of training data;
      b) determining whether the new tree has better predictional value than the present tree; and,
      c) upon determining that the new tree has better predictional value than the present tree, replacing the present tree with the new tree,
   until the decision tree has been constructed.

20. The medium of claim 19, wherein the plurality of intervals consists of a first interval and a second interval, the first interval of less than the median, and the second interval of greater than or equal to the median.

21. The medium of claim 19, wherein the plurality of intervals as dynamically determined accounts for the relevant sub-set of the set of training data potentially having missing values for the predictor variable.

22. A machine-readable medium having instructions stored thereon for execution by a processor to perform a method for constructing a decision tree utilizing a set of training data comprising:
   starting with a present tree, repeating
      determining a new tree having a leaf of the present tree replaced by a continuous split on a predictor variable having a plurality of intervals, the plurality of intervals based at least in part on a predetermined number of percentiles of a relevant sub-set of the set of training data, and dynamically determined without sorting of the relevant sub-set of the set of training data;

determining whether the new tree has better predictional value than the present tree; and, upon determining that the new tree has better predictional value than the present tree, replacing the present tree with the new tree, until the decision tree has been constructed.

23. The medium of claim 22, wherein the plurality of intervals as dynamically determined accounts for the relevant sub-set of the set of training data potentially having missing values for the predictor variable.

* * * * *